United States Patent [19]

Jezek et al.

[11] 4,148,126
[45] Apr. 10, 1979

[54] TOOL AND METHOD FOR ASSEMBLING THREADED BURSTER RETAINER IN A PROJECTILE

[75] Inventors: Bruce W. Jezek; Glen L. McClung, both of Baltimore, Md.

[73] Assignee: The United States of America as represented by the Secretary of the Army, Washington, D.C.

[21] Appl. No.: 892,347

[22] Filed: Mar. 31, 1978

[51] Int. Cl.² .................. B23Q 3/00; B23P 19/04; B25B 13/58; B25B 13/02
[52] U.S. Cl. ........................... 29/464; 29/240; 81/90 C; 81/180 R; 102/56 R
[58] Field of Search ............... 29/428, 240, 1.2, 464; 81/90 C, 180 R; 102/56 R

[56] References Cited

U.S. PATENT DOCUMENTS

| | | | |
|---|---|---|---|
| 1,030,732 | 6/1912 | Jenkins et al. | 29/240 |
| 1,494,718 | 5/1924 | Semple | 102/56 R |
| 2,422,090 | 6/1947 | Fuess | 102/56 R |
| 2,641,052 | 6/1953 | Fennema et al. | 29/240 X |
| 2,981,189 | 4/1961 | Pars | 81/90 C X |
| 3,503,113 | 3/1970 | Lagsdin | 29/240 X |
| 3,827,127 | 8/1974 | Tanihata et al. | 29/240 |

FOREIGN PATENT DOCUMENTS

| | | | |
|---|---|---|---|
| 103153 | 2/1938 | Australia | 29/240 |
| 103805 | 2/1917 | United Kingdom | 29/240 |

*Primary Examiner*—Charlie T. Moon
*Attorney, Agent, or Firm*—Nathan Edelberg; A. Victor Erkkila; Max Yarmovsky

[57] ABSTRACT

An assembly tool utilizes a tubular bar to support and torque a pronged disk-shaped work holding member on one end and a socket disposed in a knurled handle end. An alignment wheel is axially fixedly positioned on the bar proximate to the work holding member. A movable alignment ring slidably disposed on the bar intermediate the handle end of the bar and the alignment wheel is used in conjunction with the alignment wheel to help guide, insert and tighten a threaded burster retainer work piece in a projectile case while torque is applied to the tubular support bar.

6 Claims, 5 Drawing Figures

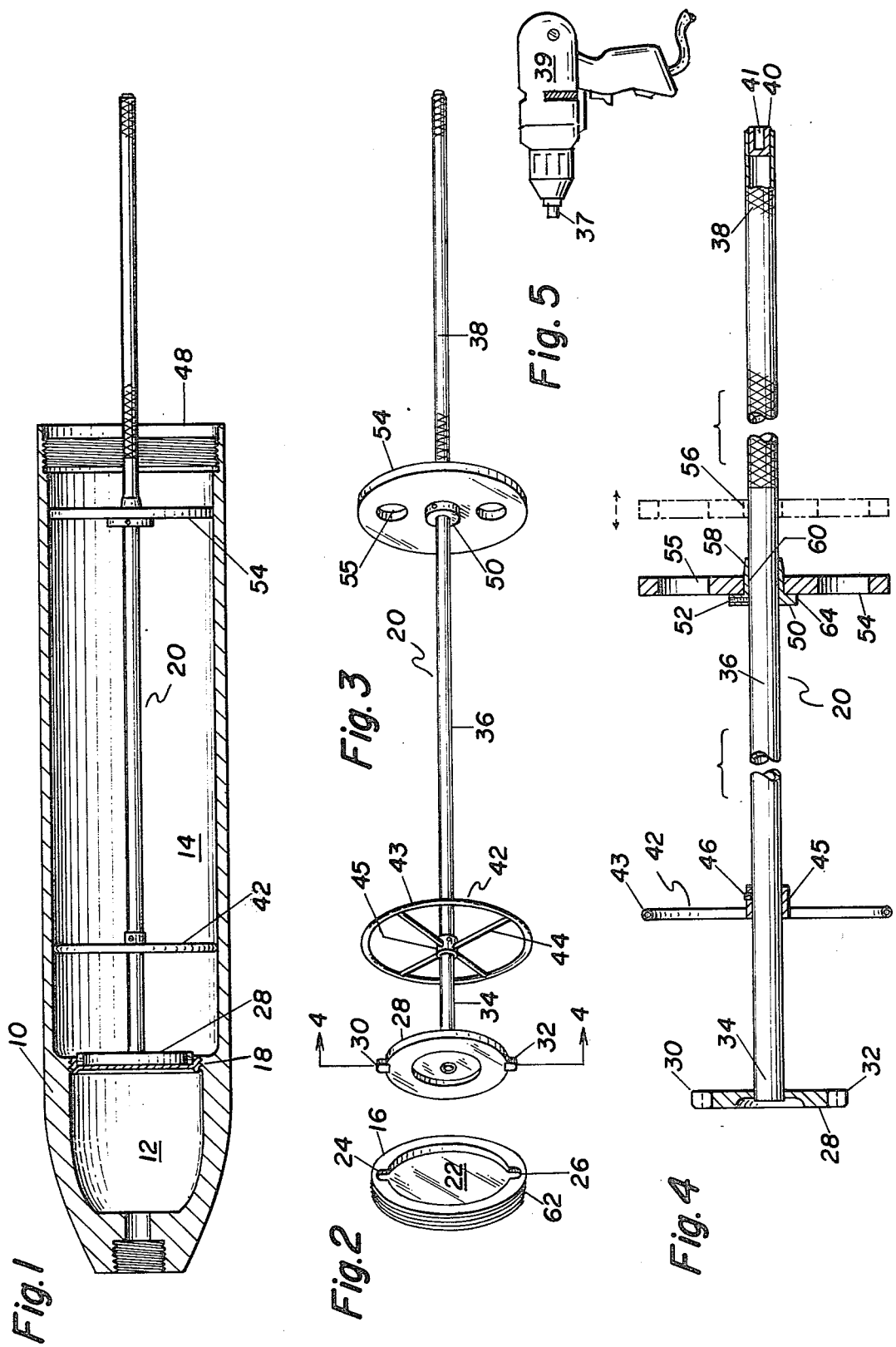

TOOL AND METHOD FOR ASSEMBLING THREADED BURSTER RETAINER IN A PROJECTILE

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to position a threaded work piece within a recess of a housing. The problem with most of the previous prior art combinations of gripping and torquing assembly tools has been the failure of these tools to provide self-alignment features which would prevent cross-threading while permitting the torquing tool to be used both in a manual and power assist mode that was suitable for production type operations.

SUMMARY OF THE INVENTION

The present invention relates to a burster retainer production type assembly tool which facilitates the insertion and tightening of an externally threaded retainer member into the interior of an internally threaded binary sectioned projectile.

An object of the present invention is to provide a rapid means for threading an externally threaded burster retainer member to an internally threaded section of a binary projectile body.

Another object of the present invention is to provide an assembly tool and method for the insertion and tightening of an externally threaded retainer member in an internally threaded section of a binary sectioned projectile body which allows for both manual and production operation.

A further object of the present invention is to provide an assemby tool for threading a burster retainer in a binary projectile body which insures a positive means and method for starting the threads of the retainer and body parts while minimizing the potential for cross threading.

For a better understanding of the present invention, together with other and further objects thereof, reference is made to the following descriptions taken in connection with the accompanying drawings.

BRIEF DESCRIPTION OF THE DRAWINGS

FIG. 1 is a longitudinal diametral partial cross-sectional view of a binary projectile body having a burster retainer member inserted therein by a production type assembly tool.

FIG. 2 is an isometric view of the burster retainer member.

FIG. 3 is an isometric view of the production assembly tool.

FIG. 4 is a cross-sectional view taken along line 4—4 of FIG. 3.

FIG. 5 is a diagrammatic view of a pneumatic nutrunner.

Throughout the following description like reference numerals are used to denote like parts of the drawings.

DESCRIPTION OF THE PREFERRED EMBODIMENTS

Referring now to FIGS. 1–3, projectile binary housing 10 has a forward warhead chamber 12 and a rear warhead chamber 14. Forward chamber 12 is separated from rear chamber 14 by an externally threaded burster retainer disk member 16 which is screwedly attached to the internally threaded forward chamber bore 18 by burster retainer assembly tool 20. Burster retainer disk member 16 has a counter bore 22 and two diametrically disposed semi-circularly grooves 24 and 26 communicating therewith.

Referring now to FIGS. 1–5, the burster retainer assembly tool comprises six main parts. A circularly shaped assembly head 28 having two diametrically disposed tabs 30 and 32 fixedly positioned in the periphery of assembly head 28. Tabs 30 and 32 are fabricated from tool steel to prevent excessive wear. The diameter of assembly head 28 and the shape and size of tabs 30 and 32 are designed so that they slidably fit into the counterbore 22 and grooves 24 and 26 respectively. Assembly head 20 is axially fixedly attached to the forward end 34 of tubular torque bar 36. The knurled rear end 38 of torquing bar 36 has a female socket connection 40 fixedly disposed therein. Socket 40 has a square shaped counterbore 41 therein which is adapted for fitting a male connection 37 of pneumatic torque device, 39, as shown in FIG. 5, such as may be found in commercially available pneumatic nutrunner power tools. A first alignment wheel 42 has a circular tubular rim member 43 fixedly connected by a plurality of equally spaced spokes 44 to an axial hub 45 which is in turn fixedly attached to the forward end 34 of torque bar 36 by a set screw 46. Alignment wheel 42 is positioned sufficiently close to assembly head 28 so that an operator can easily and visibly guide an assembly head 28, loaded with retainer disk 16 through the projectile housing rear open end 48. The alignment wheel 42 is located on tubular bar to help center the assembly head 28 as it is pushed through the rear warhead chamber 14 and to provide some freedom to the operator in manually getting the threads of externally threaded burster retainer 16 started with the threads of forward internally threaded chamber bore 18. A hub bushing member 50 is fixedly positioned on tubular bar 36 by set screw 52 so that is is intermediate to alignment wheel 42 and socket 40. A disk shaped second alignment wheel 54 is made of aluminum having a plurality of gripping holes 55 transversely disposed therein. Wheel 54 has a central bore 56 therethrough which slidably fits over the rear end 38 of torque bar 36 and passes over the tapered front end 58 to enable wheel 54 to rotate on bearing surface 60 of bushing member 50.

In operation, the burster retainer 16 is placed on assembly head 28 so that tabs 30 and 32 fit into grooves 24 and 26. By holding the tubular bar 36 of the assembly tool 20, the burster retainer 16 is manually inserted into the rear of the projectile binary housing 10 through open end 48 and pushed through rear warhead chamber 14 until the external threads 62 contact the threads of forward chamber bore 18. The threads 62 are started by rotating the knurled end 38 in a proper direction. Once the threads 62 are engaged, the second alignment wheel 54 is slipped over rear end 38 of bar 36 until it contacts flange 64 of hub 50. The second alignment wheel 54 in combination with the first alignment wheel 42 axially aligns assembly tool 20 fore and aft within housing 10 to assure that the burster retainer member 16 will be threaded properly. A pneumatic nutrunner device male connection 37 is inserted into socket 40 and turned on, rapidly screwing the burster retainer into the projectile with proper torque.

While there has been described and illustrated specific embodiments of the invention, it will be obvious that various changes, modifications and additions can be made herein without departing from the field of the invention which should be limitid only by the scope of the appended claims.

Having thus fully described the invention, what is claimed as new and desired to be secured by Letters Patent of the United States is:

1. A tool for assembling an externally threaded burster retainer member in a binary chambered projectile housing which comprises:
    a tubular torque bar having a forward end and a knurled rear end;
    socket means fixedly disposed in said knurled rear end;
    a circularly shaped assembly head axially aligned and fixedly attached to said forward end of said tubular bar, said assembly head having tab means peripherally protruding therefrom and adapted to slidably engage a grooved axial counterbore of said burster retainer member;
    a first alignment means axially attached to said tubular torque bar and proximately disposed adjacent to said assembly head for guiding said assembly head and said burster retainer member through a rear open end of said projectile housing and aiding the manual threading of said burster retainer member to said housing;
    a bushing flange means fixedly disposed on said tubular torque bar intermediate said first alignment wheel means and said socket means; and
    a second alignment wheel means in combination with said first alignment wheel for operatively axially aligning said externally threaded burster retainer in said binary chambered projectile housing while applying powered torque force through said socket means to said tubular torque bar.

2. A tool as recited in claim 1 wherin said tab means of said assembly head comprises a plurality of diametrically semi-circular tabs made of tool steel.

3. A tool as recited in claim 2 wherein said socket means comprises a female socket connection having a square shaped counterbore therein.

4. A tool as recited in claim 3 wherein said first alignment wheel means comprises:
    a circular tubular rim member;
    a plurality of equally spaced spokes fixedly connected to said rim member; and
    an axial hub fixedly connected to said spokes having a set screw operatively disposed therein for fixedly attaching said first alignment wheel means to said tubular torque bar.

5. A tool as recited in claim 4 wherein said second wheel alignment means comprises a disk shaped member made of aluminum having a plurality of gripping ports transversely disposed therethrough and a central bore therein to enable said second wheel alignment means to freely rotate on said bushing flange means.

6. A method for assemblying an externally threaded burster retainer member in a binary chambered projectile housing comprising:
    loading said burster retainer member on an assembly head supported on a forward end of a tubular torque bar;
    inserting said assembly head with said burster retainer member thereon and first alignment wheel means into an open rear end of said projectile housing until said burster retainer member abuts a threaded forward chamber section of said binary chambered projectile housing;
    rotating said tubular torque bar manually until said externally threaded burster member initially engages said threaded forward chamber section of said projectile housing;
    slipping a second alignment wheel over a knurled end of said tubular torque bar;
    pushing said second alignment wheel along said tubular torque bar through said open rear end of said projectile housing until said tubular torque bar is aligned fore and aft;
    inserting a pneumatic nutrunner connecting coupling into a socket fixedly contained in said knurled tubular torque bar;
    rotating said tubular torque bar with said pneumatic nutrunner until a given torque has been applied through said assembly head to said burster retainer member.

* * * * *